United States Patent

[11] 3,623,457

[72] Inventor Karl Gunnar Dillstrom
      Kallangsvagen, Sweden
[21] Appl. No. 850,389
[22] Filed Aug. 15, 1969
[45] Patented Nov. 30, 1971
[73] Assignee Aktiebolaget Atomenergi
      Stockholm, Sweden

[54] STEAM GENERATOR FOR GENERATING SATURATED STEAM FROM SUPERHEATED STEAM AND WATER
5 Claims, 3 Drawing Figs.

[52] U.S. Cl.................................................. 122/31, 122/34
[51] Int. Cl................................................... F22b 1/08
[50] Field of Search.................................... 122/31, 34, 407

[56] References Cited
UNITED STATES PATENTS

| | | | |
|---|---|---|---|
| 2,328,414 | 8/1943 | Beyer............................. | 122/31 |
| 3,378,456 | 4/1968 | Roberts........................... | 122/407 |
| 3,509,857 | 5/1970 | Dillstrom........................ | 122/31 |

Primary Examiner—Kenneth W. Sprague
Attorney—McGlew and Toren

ABSTRACT: A steam generator for generating saturated steam from superheated steam and water and having a plurality of nozzles which consist of a mixing portion and a flared atomizing portion adapted to atomize and vaporize respectively feed water fed to said nozzles, the arrangement of the nozzles being such that the nozzles are arranged vertically and that the widest portions of the flared vaporizing portions of the nozzles are contiguous to each other, to leave therebetween a space through which the generated saturated steam can leave the generator.

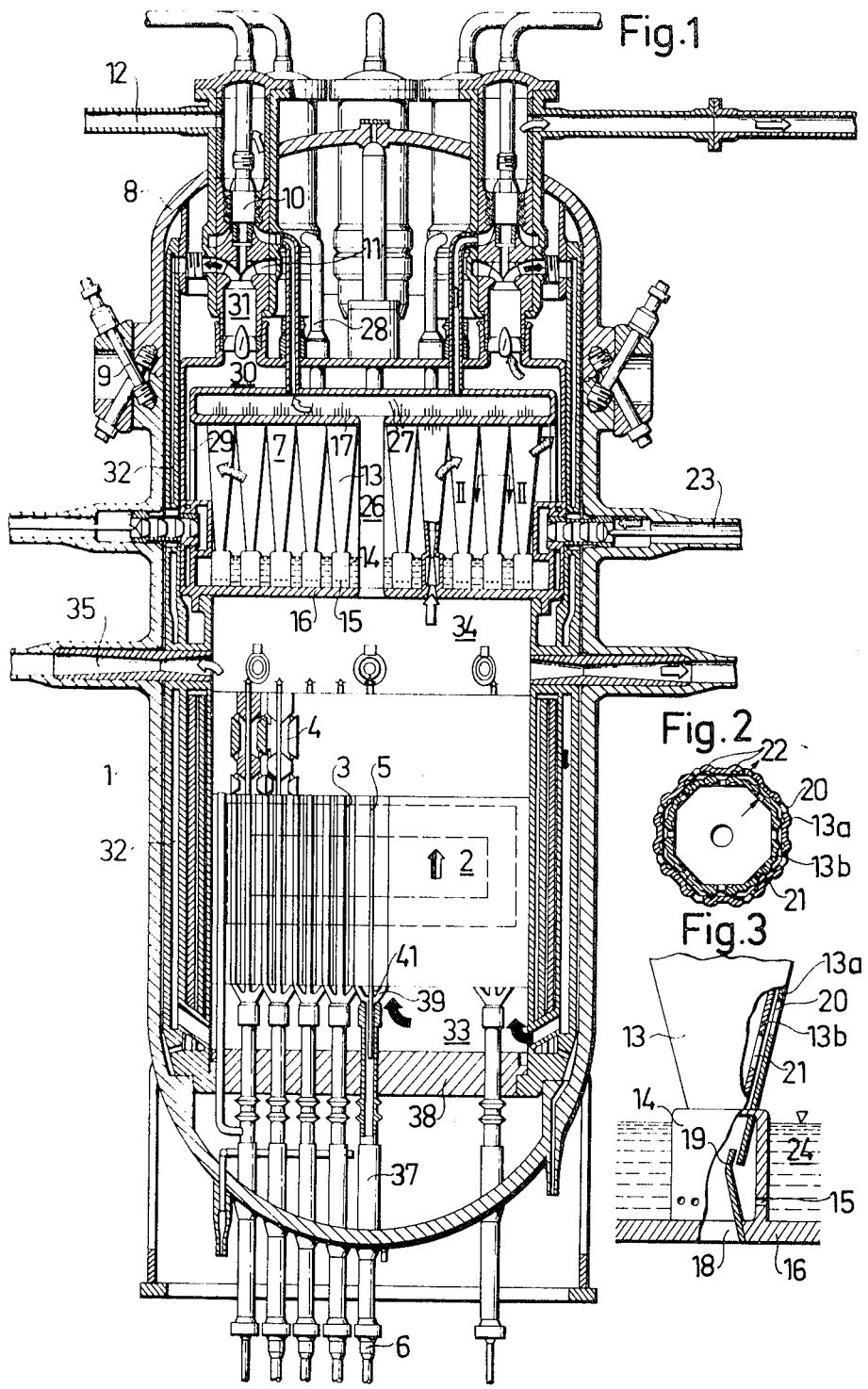

3,623,457

STEAM GENERATOR FOR GENERATING SATURATED STEAM FROM SUPERHEATED STEAM AND WATER

The present invention relates to a steam generator for producing saturated steam from superheated steam and water. The manner in which the saturated steam is produced is not restrictive to the invention although the present invention is particularly concerned with a steam generator which is supplied with superheated steam from a steam-cooled nuclear reactor. The invention is also concerned in particular with a steam generator which is built into the pressure vessel of a steam-cooled nuclear reactor.

A steam generator of a known type comprises a plurality of nozzles each of which includes supply passages for water and superheated steam, a mixer portion in which the superheated steam atomizes the water, and a flared vaporizing portion in which the droplets of water are vaporized. The prime object of the invention is to provide a steam generator of the type described which can be accommodated in a relatively small space, which is especially desired in nuclear reactors. A secondary object of the invention is to provide a steam generator which produces saturated steam which is essentially free from unvaporized droplets of water.

The steam generator of the present invention is characterized in that the nozzles are disposed between two parallel walls and arranged so that the widest parts of the vaporizing portions lie in close adjacent relationship; that the vaporizing portions of the nozzles are provided with openings in the walls; and that outlet openings for the generated saturated steam are arranged on the sides of the steam generator, whereby the saturated steam is forced to flow in the interspaces between the nozzles.

In accordance with the invention, use is made of the fact that an otherwise unused space is formed between the nozzles, as a result of the widening of the nozzles in the direction of flow. The generated saturated steam is permitted to leave the generator through this otherwise unused space. If the nozzles are arranged vertically, the total height of the steam generator need be no greater than the distance between the two parallel walls.

The invention will now be described in more detail with reference to the accompanying drawing, which shows a steam-cooled nuclear reactor provided with a steam generator of the invention.

In the drawing,

FIG. 1 is an axial section through the nuclear reactor

FIG. 2 shows in enlarged scale a section on the line II—II in FIG. 1, and

FIG. 3 shows in enlarged scale a section through a mixer portion of a nozzle.

The nuclear reactor illustrated in FIG. 1 is enclosed in a pressure vessel 1 having a cover member 8 secured in position by bolts 9. The fissile fuel in the reactor 2 is in the form of vertically positioned fuel elements 3, which are cooled by steam flowing in vertical passages.

The reactivity of the reactor is controlled in a known manner, by means of neutron-absorbing control rods 5 which are operated by operating means 6. Located above the reactor 2 is a radiation shield 4, which prevents the radiation from the reactor reaching a steam generator 7 positioned in the upper portion of the reactor. The steam generator 7 will be described in more detail below. In the upper portion of the reactor is a plurality of steam-driven turbines 10, each of which drives a compressor impeller 11 over one and the same shaft.

The steam generator 7 comprises two horizontally positioned walls 16, 17 and a plurality of nozzles 13, 14 vertically arranged between these walls. The nozzles include a mixing portion 14, which is affixed to the lower wall 16, and a vaporizing portion 13, which has a hexagonal cross section and widens upwardly and the upper portion of which is affixed to the upper wall 17. The nozzles are arranged so closely together that the upper portions of the vaporizing portions 13 touch one another. Disposed in the wall of the mixing portion 14 are water supply openings 15, while located in portion 14 is a pipe 19 for supplying superheated steam, the pipe 19 being connected to an opening 18 in the wall 16. The vaporizing portion 13 has double walls 13a and 13b, which are provided with openings 20, 21. The openings 20, 21 are so offset in relation to each other that the outflowing steam is forced to change direction, thereby causing any water droplets entrained therewith to be precipitated onto the walls. The edges of the openings are provided with grooves 22, which trap the film of water formed on the walls and conduct the water downwards.

Feed water is supplied through conduits 23 and forms a layer 24 on the lower wall 16.

The upper wall 17 of the steam generator forms the bottom wall of a steam box 25, which communicates with the space between the steam generator 7 and the radiation shield 4 via a central passage 26. The surface of wall 17 is enlarged, both towards the steam box 25 and the nozzles 13, 15, by means of a plurality of pegs 27. The steam box 25 also communicates with the turbines 10, by means of conduit 28.

The illustrated nuclear reactor functions in the following manner:

The feed water which enters the nozzles through openings 15 is atomized by the superheated steam, which enters through the openings 18 and pipes 19. The droplets of water are vaporized during their passage upwards through the vaporizing portion 13 and the resulting saturated steam flows through openings 20, 21, whereupon any water droplets which may have entrained with the steam are separated and flow back to the layer of feed water 24. The water which has precipitated onto the underside of the wall 17, is also returned to the feed water layer 24. The release of the film of water from the underside of wall 17 is facilitated by the fact that this wall is heated, by the supply of steam to the box 25, and also by the enlarged surface afforded by the pegs 27. The generated saturated steam flows laterally between the nozzles 13, 14, and leaves the steam generator through openings 29 in its sidewalls. It then flows upwards to the space 30 above the steam box 25, and then flows to the compressor impellers 11 via their inlet pipes 31, whereafter the thus compressed steam flows down, through an annular gap 32, to a collecting box 33 in the lower portion of the reactor. The saturated steam then flows up from the collecting box 33 through the reactor core 2, being superheated in said core, passes through passages in the shield 4 and reaches a collecting box 34 in the center of the reactor. A minor quantity of steam, about 10 percent of the total amount, flows from the collecting box 34, through the passage 26, the steam box 25, and the passages 28 to the turbines 10, and leaves the reactor through pipe 12. Of the remaining amount of superheated steam about two thirds flows through the nozzles 13, 14 and is used to vaporize the supplied feed water, while about one third leaves the reactor through pipe 35 to a consumer, e.g. a steam turbine.

What is claimed is:

1. A steam generator, for producing saturated steam from superheated steam and water, comprising a plurality of nozzles each of which includes supply passages for water and superheated steam, a mixer portion in which the superheated steam atomizes the water, and a flared-vaporizing portion in which the droplets of water are vaporized; said nozzles being disposed in a steam-generating chamber having an upper wall and a lower wall parallel to said upper wall; said nozzles being positioned vertically in said steam-generating chamber and arranged so that the widest parts of the vaporizing portions thereof are contiguous to one another; the vaporizing portions of said nozzles being formed with openings in the wall members thereof; the sides of said steam-generating chamber being formed with outlet openings for the generated saturated steam; whereby the saturated steam is forced to flow through the interspaces between said nozzles.

2. A steam generator as claimed in claim 1, characterized in that the vaporizing portions of the nozzles have a wall member composed of at least two walls, the aforementioned openings in said last-named walls being so displaced in relation to each other that the outflowing saturated steam is forced to change direction, thereby causing entrained droplets of water to be separated therefrom.

3. A steam generator, as claimed in claim 1, arranged in a water-cooled nuclear reactor having a core; said parallel walls extending horizontally above said core; the mixing portions of said nozzles being affixed to said lower parallel wall, which is formed with openings for the passage of superheated steam from said core to said nozzles; the upper portions of the vaporizing portions of said nozzles being attached to said upper parallel wall; and feed water lines arranged to supply feed water to the space in said steam-generating chamber above said lower parallel wall.

4. A steam generator, as claimed in claim 3, in which said upper parallel wall forms the bottom wall of a steam box fed with superheated steam from said core; and means enlarging the surface area of said upper parallel wall.

5. A steam generator, as claimed in claim 4, in which said enlarging means comprises pegs.

* * * * *